United States Patent
Kamata

(10) Patent No.: US 9,599,119 B2
(45) Date of Patent: Mar. 21, 2017

(54) BEARING DEVICE FOR TURBOCHARGER

(75) Inventor: Keitaro Kamata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 539 days.

(21) Appl. No.: 14/124,013

(22) PCT Filed: Jun. 22, 2012

(86) PCT No.: PCT/JP2012/065999
§ 371 (c)(1),
(2), (4) Date: Dec. 5, 2013

(87) PCT Pub. No.: WO2013/002141
PCT Pub. Date: Jan. 3, 2013

(65) Prior Publication Data
US 2014/0112776 A1 Apr. 24, 2014

(30) Foreign Application Priority Data
Jun. 30, 2011 (JP) ................... 2011-145796

(51) Int. Cl.
F04D 29/04 (2006.01)
F01D 25/16 (2006.01)
F16C 17/18 (2006.01)
F04D 29/046 (2006.01)
F01D 25/18 (2006.01)
F02B 39/14 (2006.01)
(Continued)

(52) U.S. Cl.
CPC ......... *F04D 29/046* (2013.01); *F01D 25/166* (2013.01); *F01D 25/186* (2013.01); *F02B 39/14* (2013.01); *F16C 17/18* (2013.01); *F16C 33/1075* (2013.01); *F16C 33/1085* (2013.01); *F05D 2220/40* (2013.01); *F16C 17/02* (2013.01); *F16C 2360/24* (2013.01)

(58) Field of Classification Search
CPC .... F04D 29/046; F01D 25/186; F01D 25/166; F16C 33/1085; F16C 33/1075; F16C 17/18
See application file for complete search history.

(56) References Cited

FOREIGN PATENT DOCUMENTS

CN         1650091 A       8/2005
DE   10 2008 000 853 A1   10/2009
(Continued)

OTHER PUBLICATIONS

Extended European Search Report effective Mar. 18, 2015 issued in the corresponding EP Application No. 12803960.9.
(Continued)

*Primary Examiner* — Gregory Anderson
*Assistant Examiner* — Michael Sehn
(74) *Attorney, Agent, or Firm* — Birch, Stewart, Kolasch & Birch, LLP

(57) ABSTRACT

A bearing for a turbocharger includes a bearing housing having a bearing portion of the turbocharger, a rotor shaft penetrating the interior of the bearing housing, a floating bush interposed between the bearing portion and the rotor shaft and configured to supply lubricating oil to an outer peripheral surface and an inner peripheral surface via an oil supply hole interconnecting the outer and inner peripheral surfaces, and a pressure receiving part for generating pressure by catching the flow of the lubricating oil, which is provided at a position on the inner peripheral surface of the floating bush not communicating with the oil supply hole.

14 Claims, 5 Drawing Sheets

(51) Int. Cl.
*F16C 33/10* (2006.01)
*F16C 17/02* (2006.01)

(56) References Cited

FOREIGN PATENT DOCUMENTS

| JP | 58-142014 A | 8/1983 |
|---|---|---|
| JP | 1-193409 A | 8/1989 |
| JP | 8-74851 A | 3/1996 |
| JP | 2000-130432 A | 5/2000 |
| JP | 2007-46642 A | 2/2007 |
| JP | 2007-71165 A | 3/2007 |
| JP | 2008-190498 A | 8/2008 |
| JP | 2009-156333 A | 7/2009 |
| JP | 2009-167872 A | 7/2009 |
| JP | 2010-43680 A | 2/2010 |
| JP | 2010-116944 A | 5/2010 |
| JP | 2010-138757 A | 6/2010 |

OTHER PUBLICATIONS

International Preliminary Report on Patentability for PCT/JP2012/065999 mailed Jan. 16, 2014 and an English translation.
International Search Report for related application PCT/JP2012/065999 dated Sep. 4, 2012.
Japanese Notice of Allowance dated Jul. 8, 2014 for related application No. JP2011-145796 with an English translation.
Chinese Office Action mailed Apr. 29, 2015 in corresponding Chinese Application No. 201280023223.9 with an English translation.
Notice of Allowance effective Nov. 2, 2016 issued in the corresponding Application No. 201280023223.9 with an English Translation.

Rotation direction

Rotation direction

Rotation direction

Related Art

BEARING DEVICE FOR TURBOCHARGER

TECHNICAL FIELD

The present invention relates to a floating bush bearing which is ideal for a rotary machine having a high-speed rotation shaft, such as a turbocharger.

BACKGROUND ART

A floating bush bearing includes a floating bush rotatably provided in a space between a rotation shaft and a bearing housing. The floating bush bearing is configured so as to supply pressurized lubricating oil from the bearing housing to a space between an inner peripheral surface of the bearing housing and an outer peripheral surface of the floating bush and also to a space between an inner peripheral surface of the floating bush and the rotation shaft via an oil supply path provided in the floating bush in the radial direction.

The floating bush bearing is configured to support the rotation shaft stably while suppressing its vibration by a damping effect of a lubricating oil film formed in these spaces and also to prevent seizure.

FIG. 7 is a detailed view of a floating bush bearing for rotatably supporting a rotation shaft of a high-speed rotary machine such as a turbocharger.

In FIG. 7, a turbocharger 0100 is formed by a pair of vane wheels 0102a and 0102b and a rotor shaft 0104 for integrally connecting the pair of vane wheels 0102a and 0102b. A floating bush bearing 0110 is formed by a bearing housing 0112 and a floating bush 0114 placed between the bearing housing 0112 and the rotor shaft 0104. The floating bush 0114 rotatably supports the rotor shaft 0104.

Oil passages 0116 and 0118 are provided in the bearing housing 0112 and the floating bush 0114, respectively. The lubricating oil is supplied from the bearing housing 0112 through the oil passages 0116 and 0118 to the space between the inner peripheral surface of the bearing housing 0112 and the outer peripheral surface of the floating bush 0114 and the space between the inner peripheral surface of the floating bush 0114 and the rotor shaft 0104.

The floating bush 0114 is rotatably arranged and is configured to co-rotate with the rotor shaft 0104 at a speed lower than the rotor shaft 0104 due to sliding resistance against the rotor shaft 0104.

The oil films are formed in these spaces with the lubricating oil so as to prevent seizure occurring at a sliding face in the spaces and damage (wear).

JP 58-142014 A (Patent Document 1) discloses the technique in which oil supply passages are provided interconnecting the inner and outer peripheral surfaces of the floating bush, a groove part is formed in the outer or inner peripheral surface of the floating bush to communicate with the oil passages to generate a high dynamic pressure by the lubricating oil in a space of the groove part and to supply the lubricating oil to the inner and outer peripheral surfaces of the floating bush, thereby preventing seizure and damage of the inner and outer peripheral surfaces.

Described in JP 2007-46642A (Patent Document 2) is that spiral groove is provided in at least one of an inner peripheral surface or an outer peripheral surface of a fully floating bearing and that, when the fully floating bearing is rotated, distribution of the pressure loaded on the inner or outer peripheral surface from fluid (lubricating oil) changes along the axial direction by the spiral groove formed in at least one of the inner peripheral surface or the outer peripheral surface. This change makes it difficult for the fully floating bearing to be in a stable state, thereby suppressing self-induced vibration.

CITATION LIST

Patent Literature

[Patent Document 1] JP 58-142014 A
[Patent Document 2] JP 2007-46642 A

SUMMARY

Technical Problem

In Patent Document 1, the groove part is formed in the outer or inner peripheral surface of the floating bush to communicate with the oil supply passage formed between the inner and outer peripheral surfaces of the floating bush, so as to resolve shortage of the lubricating oil by the dynamic pressure of the lubricating oil.

In Patent Document 2, the spiral groove is provided in at least one of the inner and outer peripheral surfaces of the fully floating bearing so as to suppress the self-induced vibration of the fully floating bearing.

In Patent Document 1 or Patent Document 2, the structure for co-rotating the floating bearing with the rotor shaft at an early stage in an early stage of a low-speed operation range so as to reduce friction loss during low-speed rotation.

In view of the above issues, it is an object of the present invention to reduce friction loss during low-speed rotation and increase supercharging pressure in the low-speed rotational range of a turbocharger by providing a pressure-receiving section, which generates pressure by catching the flow of lubricating oil, at a position on an inner peripheral surface of a floating bush not communicating with an oil supply hole that interconnects the inner and outer peripheral surfaces of the floating bush so as to cause the floating bush to co-rotate with a rotator shaft in an early time period of a low-speed rotational range.

Solution to Problem

To achieve the object of the present invention, a bearing device for a turbocharger comprises:

a bearing housing interposed between a turbine housing and a compressor housing of a turbocharger for pressurizing supply air to a combustion chamber of an internal combustion engine, the bearing housing having a bearing portion;

a rotor shaft of a turbine rotor arranged to pass through the bearing housing; and a floating bush interposed between the bearing portion and the rotor shaft, having an oil supply hole which interconnects an outer peripheral surface and an inner peripheral surface, and being configured to supply lubricating oil from the bearing housing to the outer peripheral surface and the inner peripheral surface, and the inner peripheral surface of the floating bush is provided with a pressure receiving part for generating pressure by catching flow of the lubricating oil, the pressure receiving part being provided along the inner peripheral surface and at a position avoiding communication with the oil supply hole.

In this aspect of the present invention, it is possible to reduce rotational friction loss of the rotor shaft and increase supercharging pressure in the low-speed rotational range by providing the pressure receiving part in the inner peripheral surface of the floating bush so as to cause the floating bush to co-rotate with the rotor shaft at an early stage in the low-speed rotational range.

In the present invention, a plurality of the pressure receiving parts may be arranged at equal intervals in a circumferential direction of the inner peripheral surface of the floating bush.

With this configuration, the rotational force generated at the floating bush is balanced in the circumferential direction to minimize change of the rotational force of co-rotating the floating bush. Thus, it is possible to suppress noise or generation of rotational unevenness of the floating bush.

In the present invention, the pressure receiving part may comprise a groove which changes in depth in a rotation direction of the rotor shaft.

With this configuration, by changing the groove of the pressure receiving part in depth from the bottom face, the lubricating oil collides against an inclined surface (or a vertical surface) opposing the rotation of the lubricating oil, thereby generating the rotational force of the floating bush. This facilitates starting of the floating bush to rotate even in the low-speed rotation range of the turbocharger.

In the present invention, the pressure receiving part may comprise a groove which increases in depth in a rotation direction of the rotor shaft and whose end portion constitutes a pressure receiving face. Further, an angle θ between the pressure receiving face and a bottom face of the groove may be a right angle or an acute angle.

With this configuration, the pressure receiving part is configured so that the groove increases in depth in the rotation direction. Thus, the lubricating oil is introduced to the groove smoothly along the rotation of the rotor shaft, hence suppressing generation of bubbles (cavitations), etc. and eliminating rotation unevenness of the floating bush (rotational resistance caused by bubbles). As a result, it is possible to effectively generate pressure at the pressure receiving face and to facilitate starting of rotation of the floating bush even in the low-speed rotational range of the turbocharger Further, by setting the angle θ between the pressure receiving face and the bottom face of the groove to be a right angle or an acute angle, the lubricating oil caught by the pressure receiving face does not easily escape to the gap between the rotor shaft and the floating bush and the rotation driving force of the floating bush can be effectively obtained even in the low-speed rotational range of the rotor shaft.

In the present invention, a width of the groove may decrease along the rotation direction of the rotor shaft.

With this configuration, by reducing the width of the groove along the rotation direction of the rotor shaft, the pressure of the lubricating oil rises between the groove and the rotor shaft while reaching the pressure receiving face. The increased pressure at the pressure receiving face facilitates starting of the floating bush to rotate even in the low-speed rotational range of the turbocharger.

In the present invention, a plurality of the pressure receiving parts may be arranged at both sides of a width-directional center of the floating bush in a staggered fashion.

With this configuration, a greater number of the pressure receiving faces of the floating bush can be provided, and the rotation driving force of the floating bush increases even in the low-speed rotational range of the rotor shaft, and it is possible to prevent reduction of the bearing area between the rotor shaft and the floating bush compared to the case of arranging the pressure receiving parts at the same phase, so as to stabilize supporting of the rotor shaft.

In the present invention, the floating bush may be composed of an offset bearing which is offset from the rotor shaft.

With this configuration, between the inner peripheral surface and the rotor shaft and/or between the outer peripheral surface and the bearing housing, the gap between the inner peripheral surface and the rotor shaft and/or the gap between the outer peripheral surface and the bearing housing changes (varies) in the radial direction. Thus, a damping characteristic and a spring constant of the oil film formed in the gap also changes in the radial direction. As a result, it is possible to achieve a rotor system by which oil whip (self-induced vibration) is prevented.

Accordingly, it is possible to reduce friction loss in the low-speed rotational range of the turbocharger by causing the floating bush to co-rotate with the rotor shaft at an early stage and stabilize supporting of the rotor shaft in a high-speed rotational range.

Advantageous Effects

According to the present invention, it is possible to reduce rotational friction loss of the rotor shaft and increase supercharging pressure in the low-speed rotational range by providing the pressure receiving part in the inner peripheral surface of the floating bush so as to cause the floating bush to co-rotate with the rotor shaft at an early stage in the low-speed rotational range.

DETAILED DESCRIPTION

First Embodiment

Figure 1:
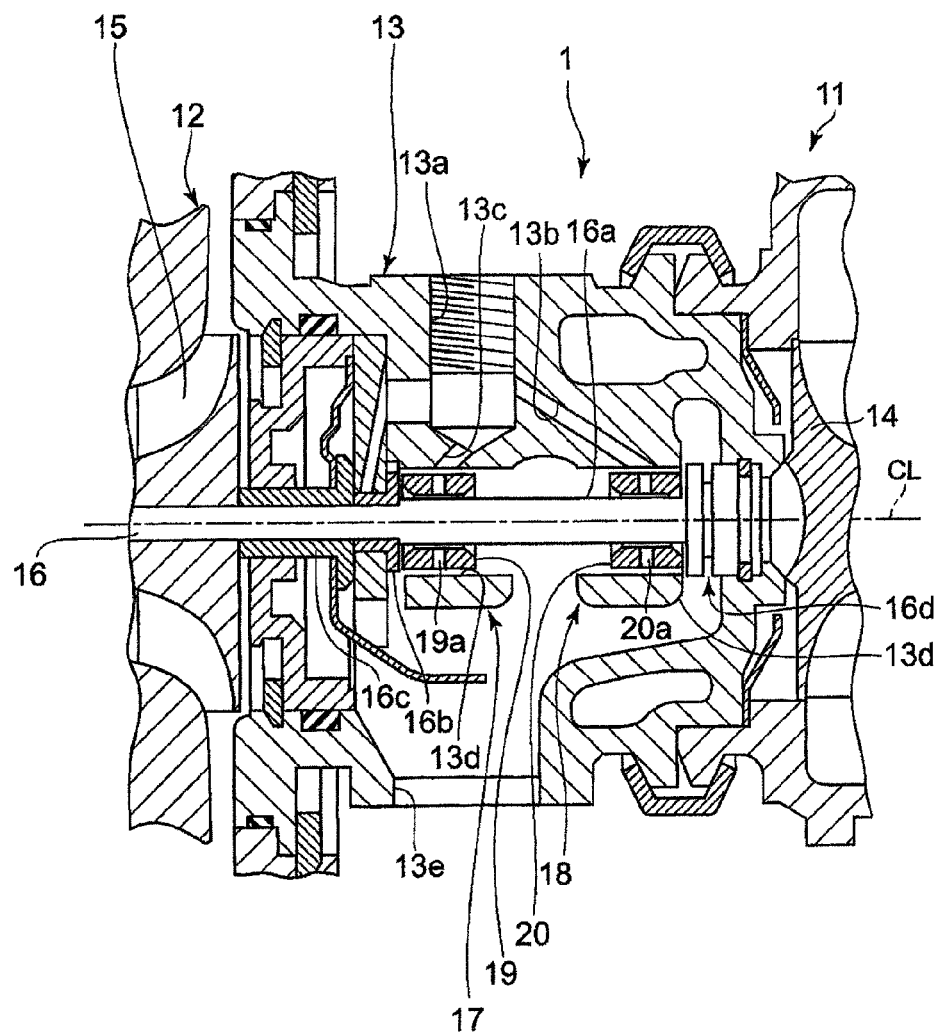
FIG. 1 is an enlarged cross-sectional view of a bearing device for a turbocharger according to a first embodiment of the present invention.

FIG. 1 illustrates a floating bush bearing which rotatably supports a high-speed rotation turbocharger according to an embodiment of the present invention.

In FIG. 1, a turbocharger 1 is formed by an exhaust turbine 14 driven by exhaust gas of an internal combustion engine (hereinafter described as "engine"), a turbine housing 11 covering the exhaust turbine 14, a compressor impeller 15 for pressurizing intake air to the engine by a driving force of the exhaust turbine 14, a compressor housing 12 for covering the compressor impeller 15, a rotor shaft 16 for integrally connecting the exhaust turbine 14 and the compressor impeller 15, a bearing housing 13 interposed between the turbine housing 11 and the compressor housing 12 and rotatably supporting the rotor shaft 16, a thrust bearing 16b receiving a thrust load of the rotor shaft 16, and a sleeve 16c for positioning the compressor impeller 15 when fastening by a fastening member (not shown) from the compressor impeller 15 side.

In the bearing housing 13, a first floating bush bearing 17 for rotatably supporting a compressor impeller side of the rotor shaft 16 and a second floating bush bearing 18 for rotatably supporting an exhaust turbine 14 side of the rotor shaft 16 are arranged.

The first floating bush bearing 17 is formed by a bearing portion 13d formed in the bearing housing 13 and a first floating bush 19 which is fitted in the bearing portion 13d and in which the rotor shaft 16 is arranged.

The first floating bush 19 is formed into an annular shape and an oil supply hole 19a is arranged to penetrate the first floating bush 19 from an outer peripheral surface to an inner peripheral surface.

The second floating bush bearing 18 is formed by a bearing portion 13d formed in the bearing housing 13 and a second floating bush 20 which is fitted in the bearing portion 13d and in which the rotor shaft 16 is arranged.

The second floating bush 20 is formed into an annular shape and an oil supply hole 20a is arranged to penetrate the second floating bush 20 from an outer peripheral surface to an inner peripheral surface.

A pipe (not shown) is connected to a connection port 13a of the bearing housing 13 to supply lubricating oil to the floating bush bearings 17 and 18.

A compressor-side lubricating oil passage 13c is an oil passage extending linearly and obliquely to the first floating bush bearing from the connection port 13a. The lubricating oil is supplied to the first floating bush bearing 17 side and then to the first floating bush bearing 17 and between the first floating bush bearing 17 and the thrust bearing 16b so as to lubricate and cool these parts.

A turbine-side lubricating oil passage 13b is an oil passage extending linearly and obliquely to the second floating bush bearing 18 from the connection port 13a. The lubricating oil is supplied to the second floating bush bearing 18 side and then to the second floating bush bearing 18 and an increased diameter portion of the rotor shaft 16 on the exhaust turbine 14 side so as to lubricate and cool these parts.

Then, the lubricating oil supplied to the first floating bush bearing 17 fills a gap between the bearing portion 13d and the first floating bush 19, passes through the oil supply hole 19a penetrating the first floating bush 19 from the outer periphery side to the inner periphery side, and is finally supplied to between the first floating bush 19 and a shaft support part 16a of the rotor shaft 16.

Further, the lubricating oil supplied to the second floating bush bearing 18 fills a gap between the bearing portion 13d and the second floating bush 20, passes through the oil supply hole 20a penetrating the second floating bush 20 from the outer periphery side to the inner periphery side, and is finally supplied to between the second floating bush 20 and the shaft support part 16a of the rotor shaft 16.

The floating bushes 19 and 20 and the rotor shaft 16 are respectively configured to be floated and supported to the bearing housing 13 using the lubricating oil.

The first floating bush bearing 17 (including the first floating bush 19) and the second floating bush bearing 18 (including the second floating bush 20) are explained above although they have the same configuration, to avoid confusion.

Hereinafter, "first floating bush bearing 17" is described as "floating bush bearing 17", and "first floating bush 19" is described as "floating bush 19".

Figure 2A:
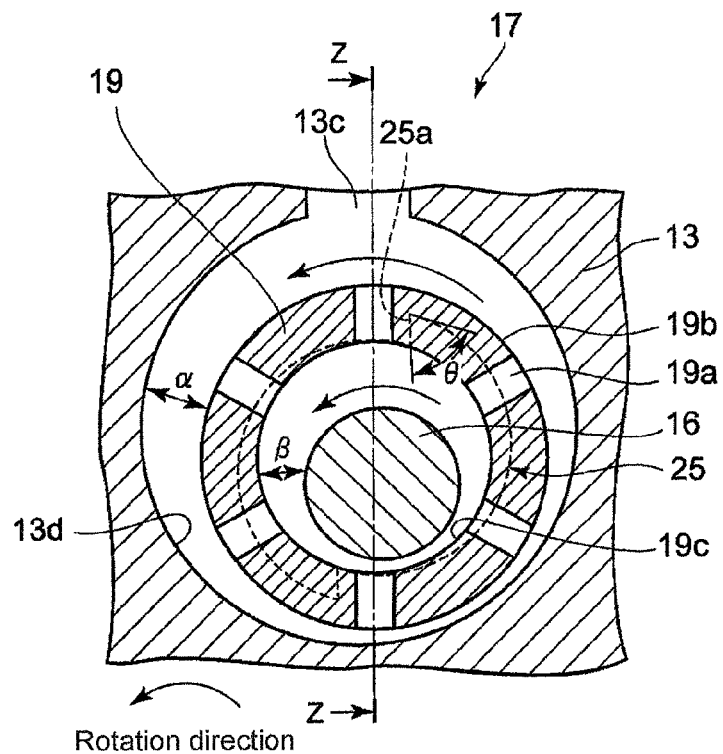
FIG. 2A is a schematic view of a floating bush bearing of the first embodiment.
Figure 2B:
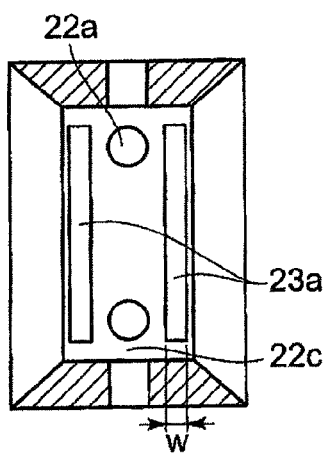
FIG. 2B is an arrow view from the arrow direction of line Z-Z of FIG. 2A.

The floating bush bearing 17 of the present invention is illustrated in and described in reference to FIG. 2A and FIG. 2B.

Figure 2C:
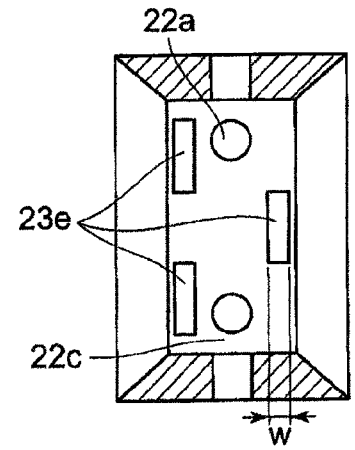
FIG. 2C is a modified example of FIG. 2B.

FIG. 2A is a schematic view of the floating bush bearing of the first embodiment. FIG. 2B is an arrow view from the arrow direction of line Z-Z of FIG. 2A. FIG. 2C is a modified example of FIG. 2B.

The floating bush 19 being a component of the floating bush bearing 17 is arranged to have a gap α for forming an oil film between the bearing portion 13d of the bearing housing 13 and an outer peripheral surface 19b of the floating bush.

The rotor shaft 16 is loosely fitted to the floating bush 19 with a gap β for forming an oil film between an inner peripheral surface 19c of the floating bush 19 and the shaft support part 16a of the rotor shaft 16.

To these gaps α, β, the lubricating oil is fed through the compressor-side lubricating oil passage 13c within the bearing housing 13 (similarly to the turbine-side lubricating oil passage 13b).

While filling the gap α, the lubricating oil passes through the oil supply hole 19a of the floating bush 19, filling the gap β between the inner peripheral surface 19c of the floating bush 19 and the shaft support part 16a, thereby supporting the rotor shaft 16 in a floating state with the lubricating oil.

In the inner peripheral surface 19c of the floating bush 19, two pressure receiving parts 25 for generating pressure by catching flow of the lubricating oil are provided along the rotation direction of the rotor 16 and at such positions that avoid communication with the oil supply hole 19a with equal distance from each other in the circumferential direction.

Figure 3:
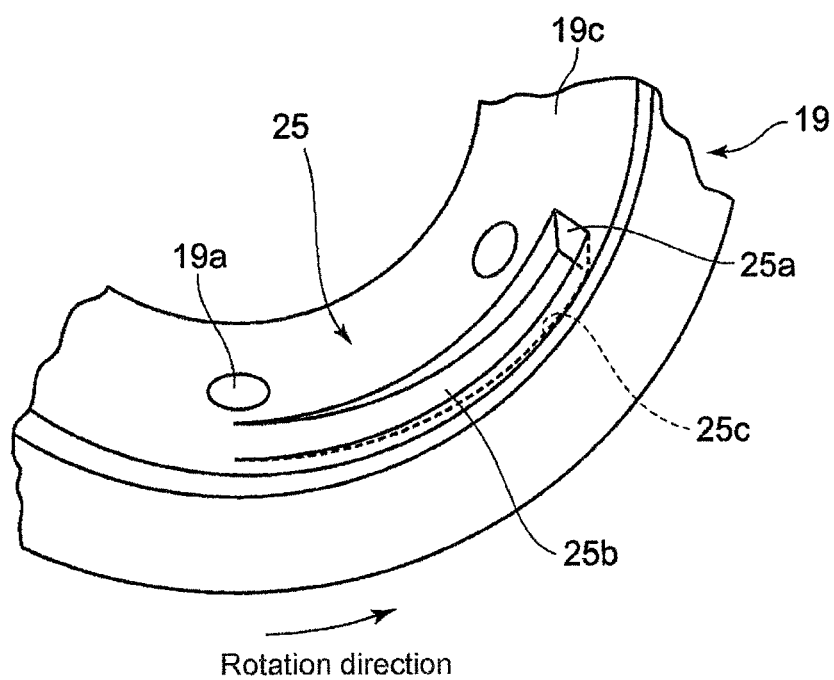
FIG. 3 is an enlarged oblique view of a section of an inner peripheral surface of the floating bush bearing of the first embodiment.

As illustrated in FIG. 3, the pressure receiving part 25 is formed by a groove 25b whose depth from a bottom face 25c (in the radial direction) smoothly increases in the rotation direction of the rotor shaft 16 from the inner peripheral surface 19c of the floating bush 19 toward the pressure receiving face 25a.

The pressure receiving part 25 is arranged along the inner peripheral surface while avoiding oil supply hole 19a.

The pressure receiving part 25 is provided only at one side of the oil supply hole 19a in the inner peripheral surface 19c. This, however, is not restrictive and the pressure receiving part 25 may be provided at each side of the oil supply hole 19a in the inner peripheral surface 19c (see FIG. 2B).

In this embodiment, an angle θ between the pressure receiving face 25a and the bottom face 25c of the groove 25b is a right angle or an acute angle.

In this embodiment, two pressure receiving parts 25 are arranged in the inner peripheral surface 19c at equal intervals in the circumferential direction. Thus, the rotational force generated at the floating bush 19 is balanced in the circumferential direction to minimize change of the rotational force of co-rotating the floating bush and thus, it is possible to suppress rotation noise or generation of rotational unevenness of the floating bush.

The pressure receiving part 25 is configured so that the groove increases in depth in the rotation direction. Thus, the lubricating oil is introduced to the groove smoothly along the rotation direction of the rotor shaft, hence suppressing generation of bubbles (cavitations), etc. and eliminating rotation unevenness of the floating bush (rotational resistance caused by bubbles). As a result, the dynamic pressure of the lubricating oil acts on the pressure receiving face 25a to effectively enhance the pressure.

Further, by setting the angle θ between the pressure receiving face 25a and the bottom face 25c of the groove 25b to be a right angle or an acute angle, the lubricating oil caught by the pressure receiving face 25a does not easily escape to the gap between the rotor shaft 16 and the floating bush 19 and this has an effect of facilitating enhancement of a rotation driving force of the floating bush 19 even in a low-speed rotational range of the rotor shaft 16.

Furthermore, the width W of the groove 25B is set constant. This, however, is not restrictive and the width W of the groove 25B may be configured to decrease in the rotation direction so that the pressure of the lubricating oil rises between the grooved portion and the rotor shaft while reaching the pressure receiving face 25a. The increased pressure at the pressure receiving face 25a enhances the force of the floating bush 19 which acts in the rotation direction.

Moreover, in this embodiment, the pressure receiving parts 25 are provided at two places at equal intervals in the circumferential direction. This, however, is not restrictive, and a plurality of the pressure receiving parts 25 with reduced length in the circumferential direction may be arranged at both sides of the floating bush 19 in a staggered fashion (see FIG. 2C).

In this case, a greater number of the pressure receiving faces of the floating bush can be provided, and the rotation driving force of the floating bush increases even in the low-speed rotational range of the rotor shaft 16 while preventing reduction of the bearing area between the rotor shaft and the floating bush compared to the case of arranging the pressure receiving parts at the same phase, thereby stabilizing supporting of the rotor shaft.

Second Embodiment

Figure 4:
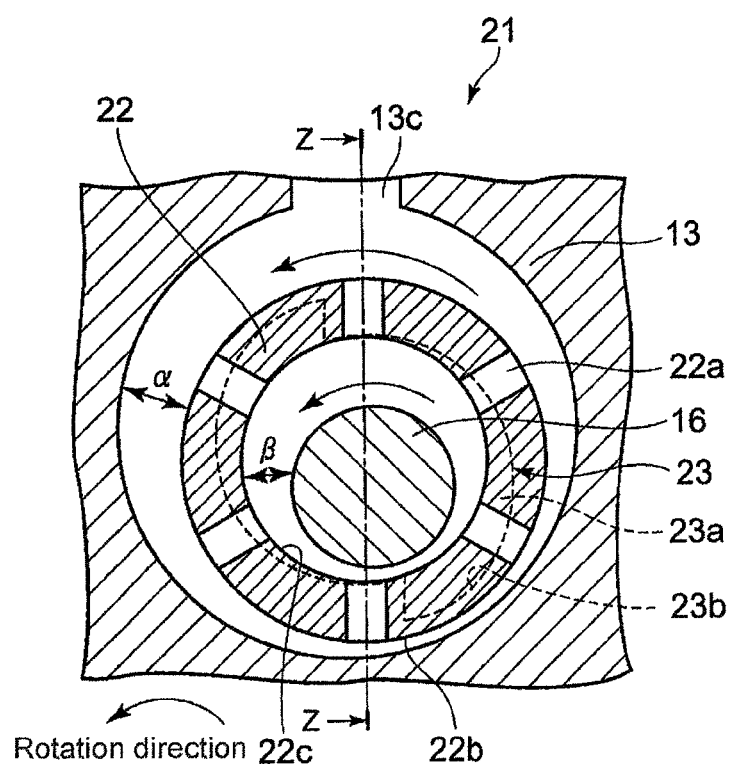
FIG. 4 is a schematic view of the floating bush bearing according to a second embodiment.

FIG. 4 shows a general configuration of a floating bush bearing according to a second embodiment of the present invention.

The general configuration of the turbocharger 1 is similar to that of the previous embodiment except for the configuration of the floating bush. Thus, the configuration of the floating bush is explained using the same reference numerals as the prior examples, whereas detailed description of the general configuration of the turbocharger 1 is omitted.

FIG. 4 illustrates a general configuration of a floating bush bearing 21. A floating bush 22 being a component of the floating bush bearing 21 is arranged to have a gap α for forming an oil film between the bearing portion 13d of the bearing housing 13 and an outer peripheral surface 22b of the floating bush 22.

The rotor shaft 16 is loosely fitted to the floating bush 22 with a gap β for forming an oil film between an inner peripheral surface 22c of the floating bush 22 and the shaft support part 16a of the rotor shaft 16.

To these gaps α, β, the lubricating oil is fed through the compressor-side lubricating oil passage 13c within the bearing housing 13 (similarly to the turbine-side lubricating oil passage 13b).

While filling the gap α, the lubricating oil passes through an oil supply hole 22a of the floating bush 22, filling the gap β between the inner peripheral surface 22c of the floating bush 22 and the shaft support part 16a, thereby supporting the rotor shaft 16 in a floating state by the oil film formed by the lubricating oil.

In the inner peripheral surface 22c of the floating bush 22, two pressure receiving parts 23 for generating pressure by catching flow of the lubricating oil are provided along the rotation direction of the rotor 16 and at such positions that avoid communication with the oil supply hole 22a with equal distance from each other in the circumferential direction.

As illustrated in FIG. 4, the pressure receiving part 23 is formed by a groove 23a. The groove 23a is configured so that the bottom face 23b which is the pressure receiving face smoothly decreases in depth from a bottom face 23b (in the radial direction) in the rotation direction in the inner peripheral surface 22c of the floating bush 22 along the rotation direction.

The bottom face 23b is configured so that the lubricating oil contacts the inclined surface with decreasing depth to generate the rotation starting force.

The grooves 23a constituting the pressure receiving part 23 are arranged at both sides of the oil supply hole 22a in the inner peripheral surface 22c, as illustrated in FIG. 2B.

Further, the width W of the groove 23a is set constant. This, however, is not restrictive and the width W of the groove 23a may be configured to decrease in the rotation direction, thereby increasing the rotation starting force of the floating bush 22.

In this embodiment, two pressure receiving parts 23 are arranged in the inner peripheral surface 22c at equal intervals in the circumferential direction. Thus, the rotational force generated at the floating bush 22 is balanced in the circumferential direction to minimize change of the rotational force of co-rotating the floating bush 22. Thus, it is possible to suppress rotation noise or generation of rotational unevenness of the floating bush 22.

As the pressure receiving part 23 is configured so that the groove decreases in depth with increasing distance in the rotation direction. Thus, the lubricating oil contacts the inclined surface to generate the rotation starting force.

Third Embodiment

Figure 5A:
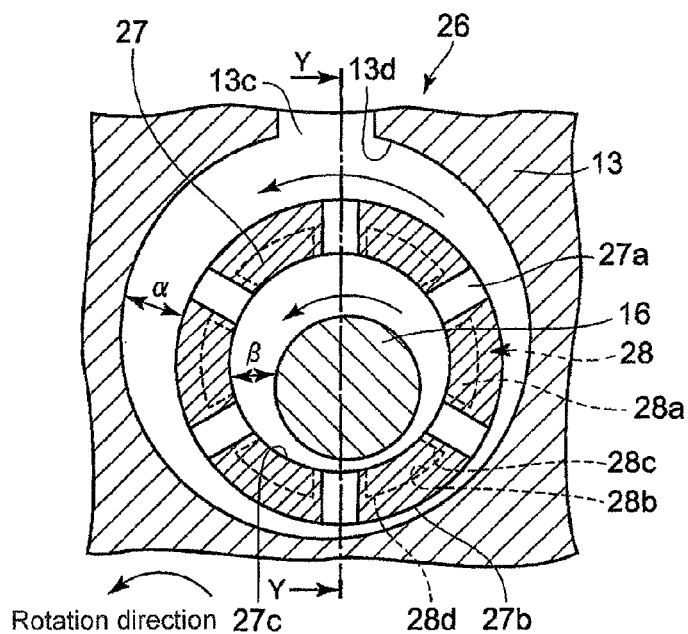
FIG. 5A is a schematic view of the floating bush bearing according to a third embodiment.
Figure 5B:
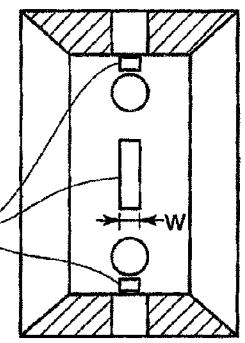
FIG. 5B is an arrow view from the arrow direction of line Y-Y of FIG. 5A.

FIG. 5A is a schematic view of the floating bush bearing 26 according to a third embodiment. FIG. 5B is an arrow view from the arrow direction of line Y-Y of FIG. 5A.

The general configuration of the turbocharger 1 is similar to that of the previous embodiment except for the configuration of the floating bush. Thus, the configuration of the floating bush is explained using the same reference numerals as the prior examples, whereas detailed description of the general configuration of the turbocharger 1 is omitted.

As illustrated in FIG. 5A, a floating bush 27 being a component of the floating bush bearing 26 is arranged to have a gap α for forming an oil film between the bearing portion 13d of the bearing housing 13 and an outer peripheral surface 27b of the floating bush 27.

The rotor shaft 16 is loosely fitted to the floating bush 27 with a gap β for forming an oil film between an inner peripheral surface 27c of the floating bush 27 and the shaft support part 16a of the rotor shaft 16.

To these gaps α, β, the lubricating oil is fed through the compressor-side lubricating oil passage 13c within the bearing housing 13 (similarly to the turbine-side lubricating oil passage 13b).

While filling the gap α, the lubricating oil passes through an oil supply hole 27a of the floating bush 27, filling the gap β between the inner peripheral surface 27c of the floating bush 27 and the shaft support part 16a, thereby supporting the rotor shaft 16 in a floating state by the oil film formed by the lubricating oil.

As illustrated in FIG. 5A, a pressure receiving part 28 is provided in the inner peripheral surface 27c of the floating bush 27. The pressure receiving part 28 is provided along the inner peripheral surface 27c and between the oil supply holes 27a in the circumferential direction.

The pressure receiving part 28 is formed by a groove 28a having the constant dept in the circumferential direction.

An angle θ between a wall face 28c in the circumferential direction and a bottom face 28c of each groove 28a is configured to be a right angle or an acute angle. The pressure receiving part 28 is configured so that the lubricating oil contacts the wall face 28c on an upstream side in the rotation direction of FIG. 5A, thereby generating the force of co-rotating the floating bush 27.

In FIG. 5B, the pressure receiving part 28 is arranged between the oil supply hole 27a and the oil supply hole 27a. This is, however, not restrictive, and the pressure receiving parts 28 may be arranged at both sides of the oil supply hole 27a or may arranged in a fashion combining these.

Further, the width W of the groove 25b is set constant. This is, however, not restrictive, and the width W may be configured to decrease in the rotation direction, thereby increasing the rotation starting force of the floating bush 27.

By arranging each of the pressure receiving parts 28 between the oil supply hole 27a and the oil supply hole 27a, the floating bush 27 has an effect of increasing the rotation driving force of the floating bush 27 even in the low-speed rotational range of the rotor shaft 16.

Fourth Embodiment

Figure 6:
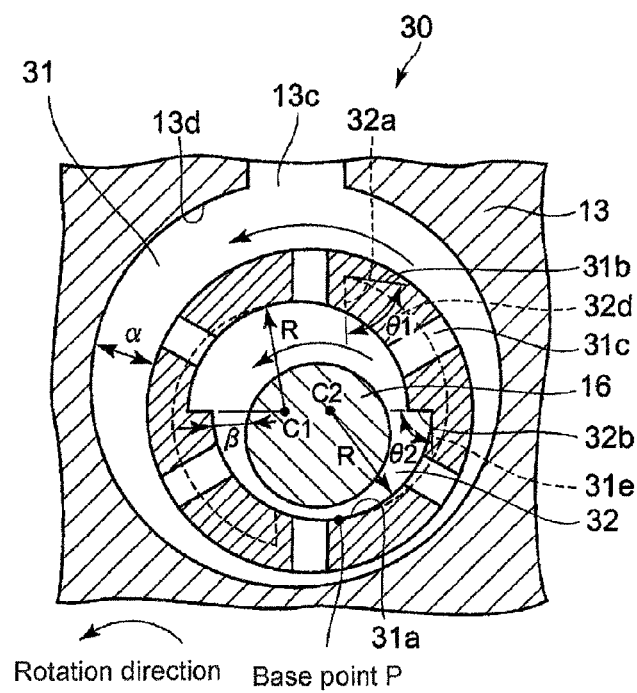
FIG. 6 is a schematic view of the floating bush bearing according to a fourth embodiment.
Figure 7:
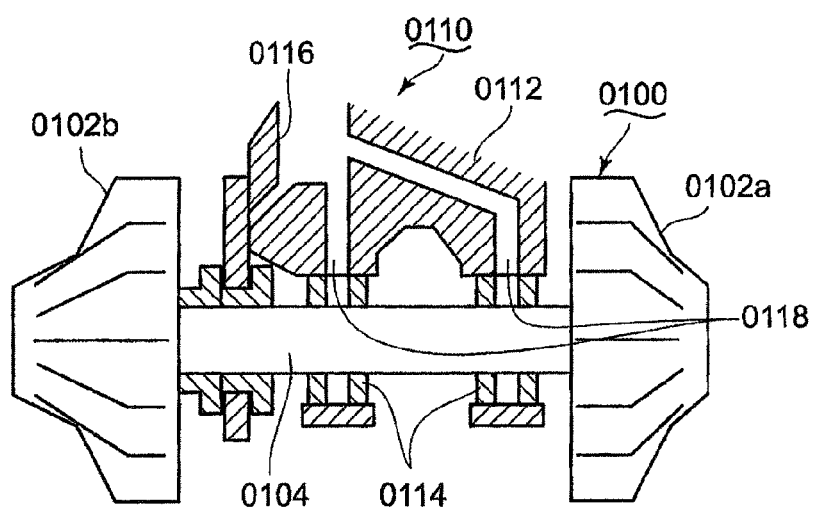
FIG. 7 is an explanatory view of related art.

FIG. 6 is an enlarged cross-sectional view of a floating bush according to a fourth embodiment.

The general configuration of the turbocharger 1 is similar to that of the previous embodiment except for the configuration of the floating bush. Thus, the configuration of the floating bush is explained using the same reference numerals as the prior examples, whereas detailed description of the general configuration of the turbocharger 1 is omitted.

A floating bush 31 being a component of the floating bush bearing 30 is arranged to have a gap α for forming an oil film between the bearing portion 13d of the bearing housing 13 and an outer peripheral surface 31b of the floating bush 31.

The rotor shaft 16 is loosely fitted to the floating bush 31 with a gap β for forming an oil film between an inner peripheral surface 31a of the floating bush 31 and the shaft support part 16a of the rotor shaft 16.

To these gaps α, β, the lubricating oil is fed through the compressor-side lubricating oil passage 13c within the bearing housing 13 (similarly to the turbine-side lubricating oil passage 13b).

While filling the gap α, the lubricating oil passes through an oil supply hole 31c of the floating bush 31, filling the gap β between the inner peripheral surface 31a of the floating bush 31 and the shaft support part 16a, thereby supporting the rotor shaft 16 in a floating state by the oil film formed by the lubricating oil.

The inner peripheral surface 31a of the floating bush 31 is formed into a multi-arc shape having two centers (C1, C2) of arcs. As illustrated in FIG. 6, the thickness of the floating bearing 30 in the radial direction changes.

Therefore, the floating bush 31 is arranged at an offset position with respect to the rotor shaft 16.

In this embodiment, the inner peripheral surface 31a of the floating bush 31 is formed into a multi-arc shape. This is, however, not restrictive, and the outer peripheral surface 31b of the floating bush 31 may be formed into a multi-arc shape, or both the inner and outer peripheral surfaces may be formed into a multi-arc shape, so as to achieve the same effects.

Further, in the inner peripheral surface 31a of the floating bush 31, two pressure receiving parts 32 are provided at equal intervals in the circumferential direction. The pressure receiving parts 32 are provided along the rotation direction of the rotor shaft 16 and at positions which avoid communication with the oil supply hole 31c. The pressure receiving parts 32 are configured to generate pressure by catching flow of the lubricating oil.

The pressure receiving part 32 has a groove 32d which smoothly increases in depth (in the radial direction) from the inner peripheral surface 31a of the floating bush 31 toward a first pressure receiving face 32a along the rotation direction of the rotor shaft 16.

A second pressure receiving face 32b is formed by removing a portion of the wall of the groove 32d from a base point P of the wall to a point which is a midpoint between the base point P and the pressure receiving face 25a and is also a mid point in the depth direction of the groove 32d (in the radial direction of the floating bush 31).

Further, an angle θ2 between second the pressure receiving face 32b and a thickness-directional face of the removed portion of the groove 32d is set to be a right angle or an acute angle. This facilitates enhancement of a rotation driving force of the floating bush 31.

As a result, the floating bush 31 is capable of, by means of the second pressure receiving face 32b in addition to the first pressure receiving face 32a, further enhancing the driving force of co-rotating with the rotor shaft 16 in the low-speed rotation range of the rotor shaft 16. Therefore, the performance of the turbocharger is further enhanced in the low-speed rotational range.

Between the inner peripheral surface 31a and the rotor shaft 16 and/or between the outer peripheral surface 31b and the bearing housing 13, the gap between the inner peripheral surface 31a and the rotor shaft 16 and/or the gap between the outer peripheral surface 31b and the bearing housing 13 changes (varies) in the radial direction. Thus, a damping characteristic and a spring constant of the oil film formed in the gap also changes in the radial direction. As a result, it is possible to achieve a rotor system by which oil whip (self-induced vibration) is prevented.

Accordingly, it is possible to reduce friction loss in the low-speed rotational range of the turbocharger by causing the floating bush 31 to co-rotate with the rotor shaft 16 at an early stage, and to stabilize supporting of the rotor shaft 16 in a high-speed rotational range.

In this embodiment, the inner peripheral surface 31a of the floating bush 31 is configured so that the arc decreases in thickness along the rotation direction of the rotor shaft 16. This is, however, not restrictive and the inner peripheral surface 31a of the floating bush 31 may be configured so that the arc increases in thickness along the rotation direction of the rotor 16 to achieve the same effect.

By causing the floating bush 31 to co-rotate with the rotor shaft 16 even at an early stage when the rotation speed of the rotor 16 is relatively low, it is possible to minimize the rotation resistance of the floating bush 31 and the rotor shaft 16 even in the low-speed rotational range of the turbocharger 1 and to increase supercharging pressure of the turbocharger 1 in the low-speed rotational range. Further, by using the offset bearing as the floating bush 31, it is possible to stabilize supporting of the rotor shaft 16 in the high-speed rotational range.

According to the present invention, between the inner peripheral surface 16c and the shaft support part 16a of the rotor shaft 16 and/or between the outer peripheral surface and the bearing housing 13, the gap between the inner peripheral surface and the rotor shaft 16 and/or the gap between the outer peripheral surface and the bearing housing 13 changes (varies) in the radial direction. Thus, a damping characteristic and a spring constant of the oil film formed in the gap also changes in the radial direction. As a result, it is possible to achieve a rotor system by which oil whip (self-induced vibration) is prevented.

Accordingly, it is possible to reduce friction loss in the low-speed rotational range of the turbocharger by causing the floating bush 31 to co-rotate with the rotor shaft 16 at an early stage, which makes it possible to increase the rotation starting force, and to stabilize supporting of the rotor shaft 16 in a high-speed rotational range.

INDUSTRIAL APPLICABILITY

According to the present invention, by providing the pressure receiving part in the inner peripheral surface of the floating bush, it is possible to cause the floating bush to co-rotate with the rotor shaft at an early stage and reduce the rotation friction resistance of the rotor shaft in the low-speed rotation range of the rotor shaft, which makes it possible to increase the rotation starting force in the low-speed rotation range. Thus, the present invention is applicable to rotary machines such as a turbocharger.

REFERENCE SIGNS LIST

1 Turbocharger
11 Turbine housing
12 Compressor housing
13 Bearing housing
13a Connection port
13b, 13c Lubricating oil passage
13d Bearing portion
14 Exhaust turbine
15 Compressor impeller
16 Rotor shaft
16a Shaft support part
17, 21, 26, 30 First floating bush bearing (floating bush bearing)
18 Second floating bush bearing
19, 22, 27, 31 First floating bush (floating bush)
19a, 20a, 22a, 27a Oil supply hole
19b Outer peripheral surface
19c Inner peripheral surface
20 Second floating bush
23, 25, 28, 32 Pressure receiving part
25a Pressure receiving face
25b Groove

The invention claimed is:

1. A bearing device for a turbocharger, comprising:
a bearing housing interposed between a turbine housing and a compressor housing of a turbocharger for pressurizing supply air to a combustion chamber of an internal combustion engine, the bearing housing having a bearing portion;
a rotor shaft of a turbine rotor arranged to pass through the bearing housing; and
a floating bush interposed between the bearing portion and the rotor shaft, having a plurality of oil supply holes which interconnect an outer peripheral surface and an inner peripheral surface, and being configured to supply lubricating oil from the bearing housing to the outer peripheral surface and the inner peripheral surface,
wherein the inner peripheral surface of the floating bush is provided with a pressure receiving part for generating pressure by catching flow of the lubricating oil, the pressure receiving part being provided as a groove extending in a circumferential direction along the inner peripheral surface over an interval encompassing adjacent oil supply holes and at a position avoiding communication with the oil supply hole.

2. The bearing device for the turbocharger according to claim 1,
wherein a plurality of the pressure receiving parts is arranged at equal intervals in a circumferential direction of the inner peripheral surface of the floating bush.

3. The bearing device for the turbocharger according to claim 2,
wherein the floating bush is composed of an offset bearing which is offset from the rotor shaft.

4. The bearing device for the turbocharger according to claim 1,
wherein the pressure receiving part comprises a groove which changes in depth in a rotation direction of the rotor shaft.

5. The bearing device for the turbocharger according to claim 4,
wherein a width of the groove decreases along the rotation direction of the rotor shaft.

6. The bearing device for the turbocharger according to claim 5,
wherein the floating bush is composed of an offset bearing which is offset from the rotor shaft.

7. The bearing device for the turbocharger according to claim 4,
wherein the floating bush is composed of an offset bearing which is offset from the rotor shaft.

8. The bearing device for the turbocharger according to claim 1,
wherein the pressure receiving part comprises a groove which increases in depth in a rotation direction of the rotor shaft and whose end portion constitutes a pressure receiving face.

9. The bearing device for the turbocharger according to claim 8,
wherein the floating bush is composed of an offset bearing which is offset from the rotor shaft.

10. The bearing device for the turbocharger according to claim 8,
wherein an angle θ between the pressure receiving face and a bottom face of the groove is a right angle or an acute angle.

11. The bearing device for the turbocharger according to claim 10,
wherein the floating bush is composed of an offset bearing which is offset from the rotor shaft.

12. The bearing device for the turbocharger according to claim 1,
wherein a plurality of the pressure receiving parts is arranged at both sides of a width-directional center of the floating bush in a staggered fashion.

13. The bearing device for the turbocharger according to claim 12, wherein the floating bush is composed of an offset bearing which is offset from the rotor shaft.

14. The bearing device for the turbocharger according to claim 1,
wherein the floating bush is composed of an offset bearing which is offset from the rotor shaft.

* * * * *